US009266789B2

(12) United States Patent
Ortiz-Suarez et al.

(10) Patent No.: US 9,266,789 B2
(45) Date of Patent: Feb. 23, 2016

(54) LIQUID DICYANDIAMIDE AND/OR ALKYL THIOPHOSPHORIC TRIAMIDE COMPOSITIONS AND THEIR USE IN AGRICULTURAL APPLICATIONS

(71) Applicants: Marivi Ortiz-Suarez, Burlington, NJ (US); Thomas Ruch, Voorhees, NJ (US); Krish Shanmuga, Plainsboro, NJ (US)

(72) Inventors: Marivi Ortiz-Suarez, Burlington, NJ (US); Thomas Ruch, Voorhees, NJ (US); Krish Shanmuga, Plainsboro, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/135,968

(22) Filed: Dec. 20, 2013

(65) Prior Publication Data

US 2014/0174140 A1 Jun. 26, 2014

Related U.S. Application Data

(60) Provisional application No. 61/739,869, filed on Dec. 20, 2012, provisional application No. 61/834,544, filed on Jun. 13, 2013.

(51) Int. Cl.
| C05C 9/00 | (2006.01) |
| C05C 11/00 | (2006.01) |
| C05G 3/08 | (2006.01) |
| C05C 7/00 | (2006.01) |

(52) U.S. Cl.
CPC ... *C05G 3/08* (2013.01); *C05C 7/00* (2013.01); *C05C 9/00* (2013.01); *C05C 11/00* (2013.01)

(58) Field of Classification Search
CPC ............. C05C 9/00; C05C 11/00; C05G 3/08
See application file for complete search history.

(56) References Cited

U.S. PATENT DOCUMENTS

| 3,152,039 | A | 10/1964 | Mattson |
| 3,353,949 | A | 11/1967 | Nau |
| 3,425,819 | A | 2/1969 | Barry et al. |
| 3,986,859 | A | 10/1976 | Molinet |
| 4,530,714 | A | 7/1985 | Kolc et al. |
| 4,943,307 | A | 7/1990 | Detre et al. |
| 5,024,689 | A | 6/1991 | Sutton et al. |
| 5,071,463 | A | 12/1991 | Narayanan et al. |
| 5,160,528 | A | 11/1992 | Chaudhuri et al. |
| 5,352,265 | A | 10/1994 | Weston et al. |
| 5,364,438 | A | 11/1994 | Weston et al. |
| 5,435,821 | A | 7/1995 | Duvdevani et al. |
| 5,698,003 | A * | 12/1997 | Omilinsky et al. ............... 71/28 |
| 5,770,771 | A | 6/1998 | Sulzer et al. |
| 5,883,297 | A | 3/1999 | Sulzer et al. |
| 6,262,183 | B1 | 7/2001 | Domb et al. |
| 6,830,603 | B2 | 12/2004 | Whitehurst et al. |
| 8,048,189 | B2 | 11/2011 | Whitehurst et al. |
| 8,133,294 | B2 | 3/2012 | Whitehurst et al. |
| 8,163,058 | B2 | 4/2012 | Whitehurst et al. |
| 8,603,211 | B2 | 12/2013 | Rahn et al. |
| 2003/0211943 | A1 | 11/2003 | Harwell |
| 2004/0163434 | A1 | 8/2004 | Quin |
| 2006/0185411 | A1 | 8/2006 | Hojjatie et al. |
| 2007/0077428 | A1 | 4/2007 | Hamed et al. |
| 2007/0157689 | A1 * | 7/2007 | Sutton et al. ............... 71/28 |
| 2007/0295047 | A1 | 12/2007 | Sutton |
| 2010/0206030 | A1 | 8/2010 | Whitehurst et al. |
| 2010/0206031 | A1 | 8/2010 | Whitehurst et al. |
| 2010/0218575 | A1 | 9/2010 | Wissemeier et al. |
| 2011/0113842 | A1 | 5/2011 | Urrutia et al. |
| 2011/0154874 | A1 | 6/2011 | Rahn et al. |
| 2011/0196172 | A1 | 8/2011 | Kysilka et al. |
| 2011/0233474 | A1 * | 9/2011 | Cigler ............... 252/400.21 |
| 2011/0259068 | A1 | 10/2011 | Whitehurst et al. |
| 2011/0314883 | A1 | 12/2011 | Whitehurst et al. |
| 2012/0148752 | A1 | 6/2012 | Lambeth et al. |
| 2013/0145806 | A1 * | 6/2013 | Iannotta et al. ............ 71/27 |
| 2013/0174623 | A1 * | 7/2013 | Gabrielson ............... 71/29 |
| 2013/0276495 | A1 | 10/2013 | Sutton et al. |
| 2014/0037570 | A1 | 2/2014 | Whitehurst et al. |
| 2014/0047881 | A1 * | 2/2014 | Roberts ............... 71/28 |
| 2014/0060132 | A1 * | 3/2014 | Roberts ............... 71/28 |
| 2014/0090432 | A1 * | 4/2014 | McKnight et al. ........... 71/28 |
| 2014/0174140 | A1 | 6/2014 | Ortiz-Suarez et al. |
| 2014/0326030 | A1 | 11/2014 | Phillip et al. |
| 2015/0031786 | A1 | 1/2015 | Lambeth |
| 2015/0143860 | A1 | 5/2015 | McKnight et al. |

FOREIGN PATENT DOCUMENTS

| CN | 1417172 A | 5/2003 |
| CN | 101108781 A | 1/2008 |
| CN | 101200400 | 6/2008 |
| CN | 101200400 B | 6/2008 |
| CN | 101328097 A | 12/2008 |

(Continued)

OTHER PUBLICATIONS

Santa Cruz Biotechnology, Product Page for NBPT; CAS #94317-64-3 Data Sheet.
Rick Engel, "Volatilization losses from surface-applied urea during cold weather months", Dec. 13-14, 2011, Manitoba Agronomist Conference, Winnipeg, Manitoba.
Arkema announces its new DMSO website at www.arkema.com/dmso, 1 page, Nov. 24, 2009, http://www.arkema.com/en/media/news/news-details/Arkema-announces-its-new-DMSO-website-at-www.arkema.com-dmso/.
Rick Engel, Volatilization losses from surface-applied urea during cold weather months.

(Continued)

*Primary Examiner* — Wayne Langel

(57) ABSTRACT

An inhibitor composition contains dicyandiamide as a nitrification inhibitor, alkyl thiophosphoric triamide as a urease inhibitor, or a combination thereof, dissolved in a liquid medium comprising an organic solvent selected from, among others, one or more polar aprotic solvents, amine solvents, heterocyclic alcohol solvents, and mixtures thereof, is useful in making fertilizer compositions and in a method of fertilizing target plants.

10 Claims, No Drawings

(56) References Cited

FOREIGN PATENT DOCUMENTS

| | | |
|---|---|---|
| CN | 101723752 A | 6/2010 |
| CN | 102746073 A | 10/2012 |
| CN | 104671999 A | 6/2015 |
| EP | 2266400 A1 | 12/2010 |
| EP | 2032589 B1 | 9/2011 |
| GB | 960109 | 6/1964 |
| WO | 97/22568 | 6/1997 |
| WO | 2008000196 A1 | 1/2008 |
| WO | 2009021986 A1 | 2/2009 |
| WO | 2009021986 A8 | 2/2009 |
| WO | 2010/072184 A2 | 7/2010 |
| WO | 2010/096266 A1 | 8/2010 |
| WO | 2015001457 A3 | 1/2015 |

OTHER PUBLICATIONS

Dec. 13-14, 2011, Manitoba Agronomist Conference, Winnipeg, Manitoba.

* cited by examiner

LIQUID DICYANDIAMIDE AND/OR ALKYL THIOPHOSPHORIC TRIAMIDE COMPOSITIONS AND THEIR USE IN AGRICULTURAL APPLICATIONS

CROSS-REFERENCE TO RELATED APPLICATIONS

This application claims the benefit of U.S. Provisional Patent Application No. 61/739,869 filed Dec. 20, 2012, incorporated herein by reference in its entirety, and claims the benefit of U.S. Provisional Patent Application No. 61/834,544 filed Jun. 13, 2013, incorporated herein by reference in its entirety.

FIELD OF THE INVENTION

This invention relates to liquid compositions comprising dicyandiamide and/or an alkyl thiophosphoric triamide, methods for incorporating dicyandiamide into agricultural fertilizer compositions, agricultural fertilizer compositions comprising dicyandiamide and/or an alkyl thiophosphoric triamide, and the use of such compositions.

BACKGROUND OF THE INVENTION

In the agrochemical industry, farmers use various fertilizers to impart macronutrients to plants either by application to the soil or application to plant leaves. Nitrogen, phosphorus, potassium, calcium, magnesium, and sulfur are macronutrients that must be supplied to the plants and soil manually by farmers. In many crops, the amount of nitrogen supplied is critical to the overall quality and growth of the crop. Nitrogen is typically supplied in the form of nitrogenous, i.e., nitrogen precursor-containing, fertilizer compounds, such as urea, ammonium nitrate, or ammonium phosphate fertilizer compounds. Due to the high water solubility of these salts, however, applied nitrogen values may be lost due to run-off and leaching of the nitrogenous fertilizer compounds. Once applied, the nitrogenous fertilizer compounds are typically degraded, for example, by microorganisms present in the soil, to nitrogenous species such as $NH_4^+$, $NO_2^-$, $NO_3^-$, and ammonia gas, that may be even more readily lost through evaporation, run-off, and leaching than the fertilizer compounds themselves. If degradation of the fertilizer compounds occurs at a rate that is faster than the nitrogenous degradation products can be used by the plants, then the nitrogen values in the degradation products are at increased risk of being lost.

Nitrification and/or urease inhibitors are of potential use in delaying degradation of fertilizer compounds and thereby reducing losses of nitrogenous degradation products that would otherwise occurred in the absence of the inhibitors. The use of nitrification and/or urease inhibitors in combination with nitrogenous fertilizer compounds tends to increase the amount of time the nitrogen source remains in the soil and available for absorption by the plants, which tends to increase the effectiveness of the fertilizer and positively impact crop yield and quality.

Aqueous end use fertilizer solutions are typically prepared in the field by diluting commercially available concentrated fertilizer compositions with water. Commonly used concentrated fertilizer compositions include concentrated ammonium nitrate compositions, such as, for example, UAN 18, UAN 28, UAN 30 and UAN 32.

Dicyandiamide is potentially useful as a nitrification inhibitor in such aqueous end use fertilizer compositions, but has very low solubility (about 41 grams per liter ("g/l")) in water and so is difficult to incorporate into the aqueous end use fertilizer compositions, particularly under field conditions

SUMMARY OF THE INVENTION

Urease inhibitors can be used with a fertilizer (i.e., incorporated into a urea-containing fertilizer, e.g., urea and urea ammonium nitrate (UAN)) to slow the conversion of ammonium to ammonia gas and thus slow the loss of ammonia to volatilization, thus making ammonium available to plants in the soil for longer periods of time. Nitrification inhibitors can be used with a fertilizer (i.e., incorporated into a urea-containing fertilizer, e.g., urea and urea ammonium nitrate (UAN)) to slow the process of ammonium conversion to nitrate, and subsequently the loss of nitrate to leeching, thus making ammonium available to plants in the soil for longer periods of time. Ammonium is one of the main forms of nitrogen that can be utilized by plants. Increasing the amount of time that the nitrogen is available to the plant increases the effectiveness of the fertilizer which positively impacts crop yield and quality.

Fertilizers, in one embodiment, are common water soluble inorganic fertilizers that provide nutrients such as phosphorus-based, nitrogen-based, potassium-based or sulphur-based fertilizers. Examples of such fertilizers include: for nitrogen as the nutrient: nitrates and or ammonium salts such as ammonium nitrate, including in combination with urea e.g. as Uram type materials, calcium ammonium nitrate, ammonium suphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride. It is understood that a fertilizer composition can comprise one or a combination of the fertilizers described herein.

A typical urease inhibitor, NBPT (N-(n-butyl)-thiophosphoric triamide), however, faces drawbacks in its use as NBPT is extremely difficult to handle. NBPT is a sticky, waxy, heat and water sensitive material, which cannot be used in its solid form, as it is used at low concentrations making it difficult to evenly distribute on urea prills (i.e., large granules) and in soil. In order to evenly distribute the NBPT onto the urea, the NBPT should be dispersed into a carrier prior to being sprayed onto the urea. Thus, the use of a solvent system containing the NBPT is desirable as, in its liquid form, the solvent system is capable of distributing the NBPT into granular urea (e.g., urea prills) and into liquid fertilizers containing urea. By introducing the NBPT to liquid fertilizers containing urea (for example, urea-ammonium nitrate solutions or UAN) in a solvent system, the NBPT is capable of being better dispersed in the liquid fertilizer.

Dicyandiamide is useful as a nitrification inhibitor in aqueous agricultural applications, e.g., end use fertilizer compositions, but similar to urease inhibitors face similar drawbacks. Nitrification inhibitors, such as dicyandiamide, generally have very low solubility (about 41 grams per liter ("g/l")) in water and so it is difficult to incorporate into the aqueous end use fertilizer compositions, particularly under field conditions. As nitrification inhibitors, such as dicyandiamide, have a generally low solubility, they are used at low concentrations in water making it difficult to evenly distribute on urea-containing prills (i.e., large granules) and in soil. In order to evenly distribute the dicyandiamide onto the urea-containing prills or granules, dicyandiamide should be dispersed into a solvent carrier prior to being sprayed onto the urea. Thus, the use of a solvent system containing dicyandiamide (herein, also termed "DCD") is desirable as, in its liquid form, the solvent system is capable of distributing the dicyandiamide onto urea granules or prills, urea ammonium nitrate granules or prills or, otherwise, urea-containing granules or prills, and into liquid fertilizers containing urea or urea ammonium nitrate. By introducing the dicyandiamide to liquid fertilizers containing urea (for example, urea-ammonium nitrate solutions or UAN) in a solvent system, the dicyandiamide is capable of being better dispersed in the liquid fertilizer.

In one embodiment, concentrated fertilizer compositions include concentrated ammonium nitrate compositions, such as, for example, UAN 18, UAN 28, UAN 30 and UAN 32.

Thus, it is desirable to have a solvent system containing alkyl thiophosphoric triamide, and in particular, (N-(n-butyl)-thiophosphoric triamide), that has a favorable toxicological and/or ecological profile and desirable characteristics in terms of low volatility, biodegradability or ready biodegradability (i.e., readily biodegradable), low toxicity or low hazard level. It is desirable to have a solvent system containing dicyandiamide, that has a favorable toxicological and/or ecological profile and desirable characteristics in terms of low volatility, biodegradability or ready biodegradability (i.e., readily biodegradable), low toxicity or low hazard level. It is also desirable to have a solvent system containing a combination of dicyandiamide and an alkyl thiophosphoric triamide, in particular, (N-(n-butyl)-thiophosphoric triamide), that has a favorable toxicological and/or ecological profile and desirable characteristics in terms of low volatility, biodegradability or ready biodegradability (i.e., readily biodegradable), low toxicity or low hazard level.

The present invention described herein will become apparent from the following detailed description and examples, which comprises in one aspect, a composition for use in agricultural applications comprising at least one of a dicyandiamide or an alkyl thiophosphoric triamide, which is dissolved in a liquid medium comprising an organic solvent selected from polar aprotic solvents, amine solvents, heterocyclic alcohol solvents, and mixtures thereof.

In another aspect, described herein are methods of making a solid or concentrated liquid fertilizer compositions comprising treating one or more nitrogenous fertilizer compounds with an inhibitor composition that comprises at least one of a dicyandiamide or an alkyl thiophosphoric triamide. The inhibitor composition, in one embodiment, is dissolved in a liquid medium comprising an organic solvent selected from polar aprotic solvents, amine solvents, heterocyclic alcohol solvents, and mixtures thereof. The term treating, in one embodiment, includes spray applying the inhibitor composition with the one or more nitrogenous fertilizer compounds. The term treating, in one embodiment, includes spray contacting the inhibitor composition with the one or more nitrogenous fertilizer compounds.

In yet another aspect, described herein are concentrated liquid fertilizer compositions comprising, based on weight of the composition: (a) up to about 99 wt %, by weight of composition, of one or more nitrogenous fertilizer compounds, (b) at least one of a dicyandiamide or an alkyl thiophosphoric triamide, (c) an organic solvent selected from polar aprotic solvents, amine solvents, heterocyclic alcohol solvents, and mixtures thereof, and (d) water.

In yet another aspect, described herein are solid or substantially solid fertilizer compositions comprising: (a) solid particles of one or more nitrogenous fertilizer compounds, and (b) an inhibitor composition comprising at least one of a dicyandiamide or an alkyl thiophosphoric triamide supported on at least a portion of the solid particles.

In another aspect, described herein are methods of making an aqueous end use fertilizer composition comprising incorporating: (a) one or more nitrogenous fertilizer compounds, and (b) an inhibitor composition that comprises at least one of a dicyandiamide or an alkyl thiophosphoric triamide, the inhibitor composition dissolved in a liquid medium comprising an organic solvent selected from polar aprotic solvents, amine solvents, heterocyclic alcohol solvents, and mixtures thereof, in an aqueous medium.

In another aspect, described herein are aqueous end use fertilizer composition comprising, based on weight of the composition: (a) up to about 99 wt %, based on the weight of the composition, of one or more nitrogenous fertilizer compounds, (b) at least one of a dicyandiamide or an alkyl thiophosphoric triamide, (c) an organic solvent selected from polar aprotic solvents, amine solvents, heterocyclic alcohol solvents, and mixtures thereof, and (d), optionally, water.

In another aspect, described herein are methods for fertilizing target plants, comprising applying an aqueous end use fertilizer composition that comprises: (a) one or more nitrogenous fertilizer compounds, (b) at least one of a dicyandiamide or an alkyl thiophosphoric triamide, (c) an organic solvent selected from dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyl-oxopentanoate, dimethylaminoethanol, triethanol amine, a heterocyclic alcohol according to structure (III):

(III)

and mixtures thereof, and, optionally, (d) water, to the target plants or to an environment for the target plants. It is understood that the term heterocyclic alcohol includes dioxolane compounds.

In one embodiment, the alkyl thiophosphoric triamide is N-(n-butyl)-thiophosphoric triamide. In another embodiment, the liquid medium further comprises a solvent selected from the group consisting of: (a) at least one dioxolane compound of formula (III):

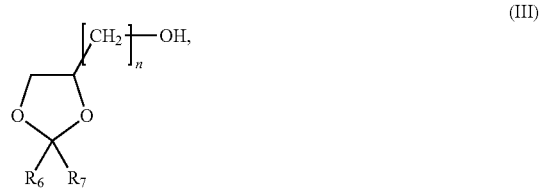

(III)

wherein $R_6$ and $R_7$ individually comprises a hydrogen, an alkyl group, an alkenyl group, or a phenyl group, wherein n is an integer of from 1 to 10; b) at least one dibasic ester; c) at least one compound of formula (IIa):

$$R_3OOC\text{-}A\text{-}CONR_4R_5 \tag{IIa}$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group; d) at least one alkyldimethylamide; e) at least one alkyl lactate; f) ethyl levulinate; g) at least one alkyoxyalcohol, ether alcohol, amine alcohol, amino alcohol or alcohol; h) at least one glycerine or glycerine derivative; i) at least one alkylene carbonate; j) dimethylsulfoxide; and k) any combination thereof. In one embodiment, the organic solvent is dimethylsulfoxide.

In another aspect, the present invention is directed to a nitrification inhibitor composition comprising dicyandiamide dissolved in a liquid medium that comprises an organic solvent selected from polar aprotic solvents, dibasic esters, amines, amino alcohols, heterocyclic alcohols, and mixtures thereof.

In yet another aspect, the present invention is directed to a method of making a solid or concentrated liquid fertilizer composition comprising treating one or more nitrogenous fertilizer compounds with a nitrification inhibitor composition that comprises dicyandiamide dissolved in a liquid medium that comprises an organic solvent selected from polar aprotic solvents, amine solvents, heterocyclic alcohol solvents, and mixtures thereof.

In a further aspect, the present invention is directed to a concentrated liquid fertilizer composition comprising, based on 100 parts by weight of the composition:
(a) up to about 99 parts by weight of one or more nitrogenous fertilizer compounds,
(b) dicyandiamide,
(c) an organic solvent selected from polar aprotic solvents, amine solvents, heterocyclic alcohol solvents, and mixtures thereof, and
(d) water.

In another aspect, the present invention is directed to a concentrated solid fertilizer composition comprising:
(a) solid particles of one or more nitrogenous fertilizer compounds, and
(b) dicyandiamide supported on at least a portion of the solid particles.

In yet another aspect, the present invention is directed to a method of making an aqueous end use fertilizer composition comprising incorporating:
(a one or more nitrogenous fertilizer compounds, and
(b) a nitrification inhibitor composition that comprises dicyandiamide dissolved in a liquid medium that comprises an organic solvent selected from polar aprotic solvents, amine solvents, heterocyclic alcohol solvents, and mixtures thereof,
in an aqueous medium.

In another aspect, the present invention is directed to an aqueous end use fertilizer composition comprising, based on 100 parts by weight of the composition:
(a) up to about 99 parts by weight of one or more nitrogenous fertilizer compounds,
(b) dicyandiamide,
(c) an organic solvent selected from polar aprotic solvents, amine solvents, heterocyclic alcohol solvents, and mixtures thereof, and
(d) water.

In a further aspect, the present invention is directed to a method for fertilizing target plants, comprising applying an aqueous end use fertilizer composition that comprises:
(a) one or more nitrogenous fertilizer compounds
(b) dicyandiamide, (c) an organic solvent selected from dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyloxopentanoate, dimethylaminoethanol, triethanol amine, a heterocyclic alcohol according to structure (III):

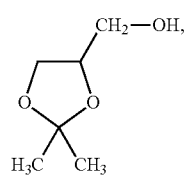

(III)

and mixtures thereof, and
(d) water,
to the target plants or to an environment for the target plants.

DETAILED DESCRIPTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "$(C_r$-$C_s)$" in reference to an organic group, wherein r and s are each integers, indicates that the group may contain from r carbon atoms to s carbon atoms per group.

Dicyandiamide is a known compound according to formula (I):

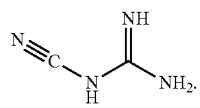

(I)

Dicyandiamide, also known as "2-cyanoguanidine", is typically made by treating cyanamide with base and is commercially available.

In one embodiment, the compositions according to the present invention comprise a urease inhibitor, such as N-(n-butyl)-thiophosphoric triamide ("NBPT") or ammonium thiosulfate, a nitrification inhibitor, or a combination of both a urease inhibitor and a nitrification inhibitor.

In one embodiment, alkyl thiophosphoric triamide is N-(n-butyl)-thiophosphoric triamide. The at least one of alkyl thiophosphoric triamide or dicyandiamide or combination thereof can be present in the composition at a lower range of 5% by weight of the composition. In another embodiment, at least one of alkyl thiophosphoric triamide and/or dicyandiamide can be present in the composition at a lower range of 6%, or 8%, or 10% or 12% or 14%, by weight of the composition. In another embodiment, the at least one of alkyl thiophosphoric triamide or dicyandiamide can be present in the composition in an amount between about 7% by weight of the composition to about 13% by weight of the composition. In another embodiment, the at least one of alkyl thiophosphoric triamide or dicyandiamide can be present in the composition in an amount between about 8% by weight of the composition to about 12% by weight of the composition.

The at least one of alkyl thiophosphoric triamide or dicyandiamide can be present in the composition in an amount between about 0.5% by weight of the composition and about 50% by weight of the composition or, in another embodiment, can be present in the composition in an amount between about 1% by weight of the composition and about 40% by weight of the composition, and, in another embodiment, can be present in the composition in an amount between about 0.5% by weight of the composition and about 20% by weight of the composition. In one particular embodiment, the at least one of alkyl thiophosphoric triamide or dicyandiamide is present in the composition in an amount between about 1% by weight of the composition and about 30% by weight of the composition. The at least one of alkyl thiophosphoric triamide or dicyandiamide means that alkyl thiophosphoric triamide can be solely present, dicyandiamide can be solely present, or a combination of alkyl thiophosphoric triamide and dicyandiamide is present.

Compounds suitable as the organic solvent component of the composition and methods of the present invention are those polar aprotic solvents, amine solvents, heterocyclic alcohol solvents, and mixtures thereof that are liquid at temperatures of from 20 to 50° C., and that do not react with dicyandiamide under anticipated manufacturing, storage, and use conditions. In one embodiment, the solvent comprises a polar aprotic solvent, amine solvent, heterocyclic alcohol solvent, or mixtures thereof in which dicyandiamide has a solubility at 25° C. of greater than or equal to 50 grams per liter (g/l), more typically greater than or equal to 200 g/l.

Suitable polar aprotic organic solvents include, for example, dichloromethane, dimethyl acetamide, dimethyl formamide, dimethyl sulfoxide, ethyl acetate, hexamethylphosphoramide, dimethyl sulfone, sulfolane, 1,3-dimethyl-2-imidazoidinone, 1,3-dimethyl-3,4,5,6-tetrahydro-2(1H)-pyrimidone, methyl acetate, ethyl lactate, methylpyrrolidone, tetrahydrofuran, propylene carbonate, and dibasic ester solvents.

Suitable dibasic ester solvents include, for example, dialkyl esters of dicarboxylic acids, more typically, the di($C_1$-$C_{12}$)alkyl esters of saturated linear or branched ($C_2$-$C_8$)aliphatic carboxylic acids or a mixture thereof. In one embodiment, the dibasic ester component comprises one or more compounds according to structure (II):

$R^1OOC-A-CONR^2R^3$ (II)

wherein:
A is a divalent linear or branched ($C_2$-$C_8$)aliphatic group, and
$R^1$, $R^2$, and $R^3$ are each independently ($C_1$-$C_{12}$)alkyl, ($C_1$-$C_{12}$)aryl, ($C_1$-$C_{12}$)alkaryl or ($C_1$-$C_{12}$)arylalkyl, and $R^2$ and $R^3$ may each optionally be substituted with one or more hydroxyl groups.

In one embodiment, the dibasic ester solvent component of the compositions and methods of the present invention comprises one or more dimethyl esters of saturated linear or branched ($C_4$-$C_6$)aliphatic carboxylic acids, such the dimethyl ester of succinic acid, dimethyl ester of ethyl succinic acid, the dimethyl ester of glutaric acid, the dimethyl ester of methyl glutaric acid, and the dimethyl ester of adipic acid, and mixtures thereof. In one embodiment, the dibasic ester component comprises the dimethyl ester of succinic acid, the dimethyl ester of glutaric acid, and optionally, the dimethyl ester of adipic acid, In another embodiment, the dibasic ester component comprises the dimethyl ester of ethyl succinic acid, the dimethyl ester of methyl glutaric acid, and optionally, the dimethyl ester of adipic acid.

In one embodiment, the dibasic ester solvent component of the compositions and methods of the present invention comprises one or more dialkyl esters of saturated linear or branched ($C_4$-$C_6$)aliphatic carboxylic acids, such the dialkyl ester of succinic acid, dialkyl ester of ethylsuccinic acid, the dialkyl ester of glutaric acid, the dialkyl ester of methylglutaric acid, and the dialkyl ester of adipic acid, and mixtures thereof. In one embodiment, the dibasic ester component comprises the dialkyl ester of succinic acid, the dialkyl ester of glutaric acid, and optionally, the dimethyl ester of adipic acid, In another embodiment, the dibasic ester component comprises the dialkyl dimethyl ester of ethylsuccinic acid, the dialkyl ester of methylglutaric acid, and optionally, the dialkyl ester of adipic acid. Each alkyl group in the dialkyl group, one embodiment, individually comprise a $C_1$-$C_8$ alkyl. In another embodiment, each alkyl group in the dialkyl group, one embodiment, individually comprise a $C_1$-$C_4$ alkyl. In another embodiment, each alkyl group in the dialkyl group, one embodiment, individually comprise a $C_1$-$C_6$ alkyl.

Suitable amine solvents include primary amines, including monoalkylamines, such as propylamine, secondary amines, including dialkyl amines and diaryl amines, such as dimethylamine and diphenylamine, and tertiary amines, such as diethylene triamine and methyl-5-(dimethylamino)-2-methyloxopentanoate.

In one embodiment, the amine solvent component of the compositions and methods of the present invention is selected from aliphatic or aromatic primary, secondary, or tertiary amines that do not comprise any functional group other than one or more amino groups.

In one embodiment, the amine solvent component of the compositions and methods of the present invention is selected from aliphatic or aromatic primary, secondary, or tertiary amines may optionally further comprise one or more additional functional groups, such as hydroxyalkyl groups, hydroxyl groups, carbonyl groups, or alkyl ester groups, other than one or more amino groups.

In one embodiment, the organic solvent component of the compositions and methods of the present invention comprises an amino alcohol. Compounds suitable as the amino alcohol solvent component of the compositions and methods of the present invention are those compounds that comprise at least one primary, secondary, or tertiary amino moiety per molecule and at least one hydroxyalkyl moiety per molecule, more typically In one embodiment, the amino alcohol is a linear, branched, or cyclic, saturated or unsaturated hydrocarbon that is substituted on at least one carbon atom with an amino group and on at least one other carbon atom with hydroxyalkyl or hydroxyl group, such as monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol, or a heterocyclic ring that comprises at least one nitrogen atom as a ring member and/or is substituted on at least one carbon atom with an amino group and that is substituted on at least one other carbon atom with a hydroxyalkyl or hydroxyl group, such as methylaminomethyl-1,3-dioxolane.

Suitable heterocyclic alcohol solvents include, for example, 5- or 6-membered heterocyclic rings that include 1 or 2 oxygen atoms as ring member, that are substituted on at least one carbon atom of the ring with a $(C_1-C_6)$hydroxyalkyl group, and that may optionally be substituted on one or more carbon atoms of the ring with one or more $(C_1-C_4)$alkyl groups. It is understood that the term heterocyclic alcohol includes dioxolane compounds. In one embodiment, the heterocyclic alcohol component of the present invention comprises a one or more compounds selected from heterocyclic alcohols according to structures (III), (IV), (V), (VI), and (VII):

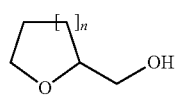

(III)

wherein n=1 or 2,

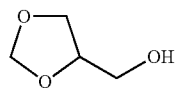

(IV)

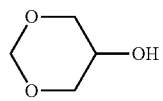

(V)

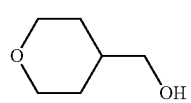

(VI)

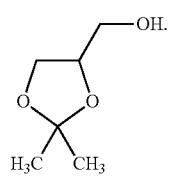

(VI)

In one embodiment, the organic solvent component of the composition and methods of the present invention comprises one or more polar aprotic solvents, one or more dibasic ester compounds according to structure (II), one or more amino alcohols, one or more tertiary amines, one or more heterocyclic alcohols according to structure (III), or a mixture thereof.

In one embodiment, the organic solvent component of the composition and methods of the present invention comprises dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyl-oxopentanoate, dimethylaminoethanol, triethanol amine, a heterocyclic alcohol according to structure (III), or a mixture thereof.

In one embodiment, the organic solvent component of the composition and methods of the present invention comprises dimethyl sulfoxide, dimethyl formamide, diethylene triamine, monoethanolamine, or a mixture thereof.

In one embodiment, the organic solvent component of the composition and methods of the present invention comprises dimethyl sulfoxide.

In one embodiment, a compound utilized as the solvent or as a component in the solvent blend is a compound of general formula (II):

$$R_3OOC-A-CONR_4R_5 \qquad (II),$$

According to one embodiment, the expression "compound" denotes any compound corresponding to the general formula (II). In other embodiments, the term "compound" also refers to mixtures of several molecules corresponding to general formula (II). It may therefore be a molecule of formula (II) or a mixture of several molecules of formula (II), wherein both fall under the definition of the term "compound" when referring to formula (II).

The $R_3$, $R_4$ and $R_5$ groups can be, in some embodiments, identical or, in other embodiment, different. In one embodiment, may be groups chosen from $C_1-C_{20}$ alkyl, aryl, alkaryl or arylalkyl groups or the phenyl group. In another embodiment, may be groups chosen from $C_1-C_{12}$ alkyl, aryl, alkaryl or arylalkyl groups or the phenyl group. Mention is made especially of Rhodiasolv® PolarClean (Manufactured by Rhodia Inc. of Cranbury, N.J.). The $R_4$ and $R_5$ groups may optionally be substituted. In one particular embodiment, the groups are substituted with hydroxyl groups.

In one embodiment, $R_3$ group is chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

$R_4$ and $R_5$ groups, which are identical or different, in one embodiment, may especially be chosen from methyl, ethyl, propyl (n-propyl), isopropyl, n-butyl, isobutyl, n-pentyl, amyl, isoamyl, hexyl, cyclohexyl or hydroxyethyl groups. The $R_4$ and $R_5$ groups may also be such that they form, together with the nitrogen atom, a morpholine, piperazine or piperidine group. According to some embodiments, $R_4$ and $R_5$ are each methyl, or $R_4$ and $R_5$ are each ethyl, or $R_4$ and $R_5$ are each hydroxyethyl.

According to one embodiment, if A comprises a linear group of formula —$CH_2$—$CH_2$— and/or of formula —$CH_2$—$CH_2$—$CH_2$—$CH_2$— and/or of formula —$(CH_2)_8$— then it is a mixture of A groups. According to one particular embodiment, if A is linear, then it is a mixture of A groups, for example a mixture of two or three —$CH_2$—$CH_2$— (ethylene); —$CH_2$—$CH_2$—$CH_2$— (n-propylene); and —$CH_2$—$CH_2$—$CH_2$—$CH_2$— (n-butylene) groups (or isomers thereof).

According to a first particular embodiment of the invention, the A group is a divalent linear alkyl group chosen from the groups of the following formulae: —$CH_2$—$CH_2$— (ethylene); —$CH_2$—$CH_2$—$CH_2$— (n-propylene); —$CH_2$—$CH_2$—$CH_2$—$CH_2$— (n-butylene), and mixtures thereof.

In one embodiment, the inhibitor composition of the present invention comprises, based on 100 parts by weight ("pbw") of the composition:

from about 4 to about 45 pbw, more typically from about 10 to about 42 pbw, and even more typically from about 20 to about 40 pbw dicyandiamide, and from about 55 to about 96 pbw, more typically from about 58 to about 90 pbw, and even more typically from about 60 to about 80 pbw of the organic solvent.

In one embodiment, the inhibitor composition of the present invention comprises one or more urease inhibitors, such as, for example, NBPT or ammonium thiosulfate.

The nitrogenous fertilizer compound is treated with the inhibitor composition by contacting the nitrogenous fertilizer composition with the inhibitor composition described herein (e.g., nitrification inhibitor or urease inhibitor or a combination of both). The nitrogenous fertilizer composition may be in solid or liquid form.

Suitable nitrogenous fertilizers are those containing a nitrogenous compound such as urea, nitrate salts, ammonium salt, or a mixture thereof, such as ammonium nitrate, ammonium sulfate, ammonium thiosulfate, ammonium polysulfide, ammonium phosphates, ammonium chloride, ammonium bicarbonate, anhydrous ammonia, calcium nitrate, nitrate soda, calcium cyanamide. In one embodiment, the nitrogenous fertilizer comprises ammonium nitrate. Suitable ammonium nitrate-containing fertilizers include, for example, UAN 18, UAN 28, and UAN 30.

In one embodiment, the nitrogenous fertilizer composition is in solid particulate form, and the contacting of the nitrogenous fertilizer composition with the inhibitor composition is conducted by, for example, spraying the composition of the present invention on the particles of solid fertilizer composition.

In one embodiment, the concentrated fertilizer composition of the present invention is a solid nitrification-inhibited fertilizer composition that comprises, based on 100 pbw of the composition:

from about 60 pbw to about 99.999, more typically from about 70 pbw to about 99.999, and even more typically from about 80 pbw to about 99.999 solid particles of one or more nitrogenous fertilizer compounds, and from about 0.001 to about 40 pbw, more typically from about 0.001 to about 30 pbw, and even more typically from about 0.001 to about 20 pbw, dicyandiamide.

In one embodiment, the solid nitrification-inhibited fertilizer composition of the present invention further comprises one or more urease inhibitors, more typically NBPT.

In one embodiment, the end use fertilizer composition of the present invention is made by combining the inhibitor composition of the present invention with a solid nitrogenous fertilizer to form a solid nitrification-inhibited fertilizer composition and subsequently dissolving the solid nitrification-inhibited fertilizer composition in an aqueous medium, typically water, in a ratio of up to about 500 pbw, more typically from 100 to 500 pbw and even more typically from about 100 to about 300 pbw, of the aqueous medium per 1 pbw of the solid nitrification-inhibited fertilizer composition.

In one embodiment, the fertilizer compound is in liquid form and the contacting of the fertilizer composition with the inhibitor composition is conducted by mixing the inhibitor composition with the liquid fertilizer composition.

In one embodiment, the concentrated fertilizer composition of the present invention is a concentrated liquid nitrification-inhibited fertilizer composition that comprises, based on 100 pbw of the composition:

from about 20 to about 99.989 pbw, more typically from about 30 to about 99.985 pbw, and even more typically from about 40 to about 99.98 pbw of one or more nitrogenous fertilizer compounds, from about 0.001 to 40 pbw, more typically from about 0.005 to 30 pbw, and even more typically from about 0.01 to 20 pbw dicyandiamide, and from about 0.01 to 60 pbw, more typically from about 0.01 to about 40 pbw, and even more typically from about 0.01 to about 30 pbw of the organic solvent.

In one embodiment, the concentrated liquid nitrification-inhibited fertilizer composition of the present invention further comprises one or more urease inhibitors, more typically NBPT.

In one embodiment, the end use fertilizer composition of the present invention is made by combining the inhibitor composition of the present invention with a concentrated nitrogenous fertilizer to form a concentrated liquid nitrification-inhibited fertilizer composition and subsequently diluting the concentrated liquid nitrification-inhibited fertilizer composition with an aqueous medium, typically water in a ratio of up to about 500 pbw, more typically from about 10 to about 500 pbw and even more typically from about 100 to about 300 pbw, of the aqueous medium per 1 pbw concentrated liquid nitrogenous fertilizer composition.

In one embodiment, the end use fertilizer composition of the present invention is made by combining the inhibitor composition of the present invention, a solid or concentrated liquid nitrogenous fertilizer, and an aqueous medium.

In one embodiment, the end use fertilizer composition of the present invention is an aqueous liquid composition that comprises water, one or more nitrogenous fertilizer compounds, and dicyandiamide, typically in an amount of from $2 \times 10^{-6}$ pbw to about 4 pbw dicyandiamide per 100 pbw of the end use fertilizer composition.

In one embodiment, the end use fertilizer composition of the present invention comprises water and based on 100 parts by weight of the composition:

from about 0.04 to about 10 pbw, more typically from about 0.06 to about 10 pbw, and even more typically from about 0.08 pbw to about 10 pbw to of one or more nitrogenous fertilizer compounds, from about $2 \times 10^{-6}$ to about 4 pbw, more typically from about $1 \times 10^{-5}$ to about 3 pbw, and even more typically from about $2 \times 10^{-4}$ to about 2 pbw dicyandiamide, and from about $2 \times 10^{-4}$ to about 6 pbw, more typically from about $2 \times 10^{-4}$ to about 4 pbw, and even more typically from about $2 \times 10^{-4}$ to about 3 pbw of the organic solvent.

In one embodiment, the end use fertilizer composition of the present invention comprises one or more urease inhibitors, more typically NBPT, alone or in combination with the nitrification inhibitor.

In one embodiment, the end use fertilizer composition of the present invention comprises from about 0.001 to about 5 pbw, more typically from about 0.01 to about 2 pbw dicyandiamide per 100 pbw of the one or more nitrogenous fertilizer compounds.

In one embodiment, the end use fertilizer composition is applied to target plants or to an environment for the target plants, i.e., to ground on or within which the target plants are growing or to be grown, at a rate of from about 0.01 pounds to about 5 pounds of the fertilizer composition, more typically from about 0.05 pounds to about 2 pounds of the fertilizer composition, per 100 square feet of ground.

In one embodiment, the end use fertilizer composition is applied to target plants or to an environment for the target plants at a rate effective to provide a dosage of nitrogenous fertilizer compound of from about 0.01 pounds to about 5 pounds of fertilizer compound, more typically from about 0.05 pounds to 2 pounds of fertilizer compound, per 100 square feet of ground.

In one embodiment, the end use fertilizer composition is applied to target plants or to an environment for the target plants at a rate effective to provide a dosage of dicyandiamide of from about 0.01 pounds to 5 pounds of dicyandiamide, more typically from about 0.05 pounds to 2 pounds of dicyandiamide, per 1000 square feet of ground.

The composition of the present invention provides improved ease of handling of dicyandiamide, improved solubility characteristics, low toxicity of the organic solvents; good storage characteristics, and excellent miscibility with aqueous compositions, such as aqueous nitrogenous fertilizer formulations.

EXAMPLE 1

The composition of Example 1 was made by dissolving 30 pbw dicyandiamide ("DCD") in 70 pbw dimethyl sulfoxide ("DMSO").

Samples of the 30 DCD/70 DMSO solution were analyzed by NMR spectroscopy immediately after formation and at 3 weeks after formation and were in each case found to contain no evidence of any reaction having occurred between the DCD and the DMSO.

Samples 30 DCD/70 DMSO solution were stored at −16° C., 4° C., RT, 45 and 54° C. and subjected to freeze-thaw cycling (cycling between 25° C. and −12° C., with a 12 hour dwell at each temperature extreme and an 8 hour ramp between the temperature extremes) and the stability of the solution was evaluated after 1 week, after 2 weeks, and after 1 month of storage under each of the storage conditions and was found to be stable under each of the storage conditions.

Samples of 5 wt %, 10 wt %, and 20 wt % of the 30 DCD/70 DMSO solution in UAN 28, 32, and 34 were made and found to be stable at room temperature for over 2 months.

EXAMPLES 2, 3, and 4

The composition of Example 2 was made by dissolving 21 pbw DCD in 79 pbw monoethanol amine.

The composition of Example 3 was made by dissolving 12 pbw DCD in a mixture of 62 pbw of a mixture of methyl-5-(dimethylamino)-2-methyl-oxopentanoate, 9 pbw propylene carbonate, and 17 pbw water The composition of Example 4 was made by dissolving 30 pbw DCD and 15 pbw N-(n-butyl)-thiophosphoric triamide in 55 pbw dimethyl sulfoxide.

Each of the compositions of Examples 2, 3, and 4 was analyzed by NMR spectroscopy immediately after formation as were in each case found to be free of evidence of any reaction having occurred between the DCD and the respective organic solvent system. Each of the compositions of Examples 2, 3, and 4 was found to be stable after storage at room temperature for at least one month.

EXAMPLE 5

NBPT (50 wt %, by weight of mixture) in DMSO (50 wt %) samples were put through stability testing at −16° C., 4° C., 25° C., 45° C., 54° C. and subjected to freeze-thaw cycling (cycling between 25° C. and −12° C, with a 12 hour dwell at each temperature extreme and an 8 hour ramp between the temperature extremes). The stability of the sample was evaluated after two weeks. All the samples were observed to remained in 1 phase, although the samples became darker at higher temperatures.

What is claimed is:

1. A composition for use in agricultural applications comprising a dicyandiamide dissolved in a liquid medium comprising an organic solvent comprising:

(a) at least one dioxolane compound of formula (Ia):

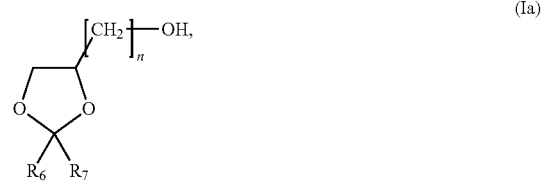

wherein $R_6$ and $R_7$ individually comprises a hydrogen, an alkyl group, an alkenyl group, or a phenyl group, wherein n is an integer of from 1 to 10; and (b) optionally, at least one compound selected from the group consisting of (b)(i) at least one dibasic ester;

(b)(ii) at least one compound of formula (IIa):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;

(b)(iii) at least one alkyldimethylamide;

(b)(iv) at least one alkyl lactate;

(b)(v) ethyl levulinate;

(b)(vi) at least one alkyoxyalcohol, ether alcohol, amine alcohol, amino alcohol or alcohol;

(b)(vii) at least one glycerine or glycerine derivative;

(b)(viii) at least one alkylene carbonate; and (b)(ix) dimethylsulfoxide.

2. The composition of claim 1 wherein the organic solvent comprises:

(a) at least one dioxolane compound of formula (Ia):

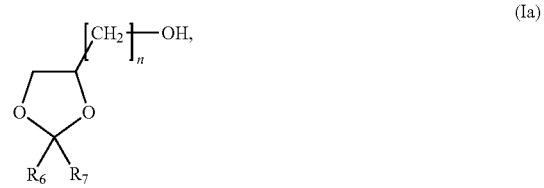

wherein $R_6$ and $R_7$ individually comprises a hydrogen, an alkyl group, an alkenyl group, or a phenyl group, wherein n is an integer of from 1 to 10; and b) dimethylsulfoxide.

3. A method of making a solid or concentrated liquid fertilizer composition comprising treating one or more nitrogenous fertilizer compounds with an inhibitor composition that comprises a dicyandiamide, the inhibitor composition dissolved in a liquid medium comprising an organic solvent comprising:

(a) at least one dioxolane compound of formula (Ia):

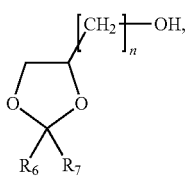

wherein $R_6$ and $R_7$ individually comprises a hydrogen, an alkyl group, an alkenyl group, or a phenyl group, wherein n is an integer of from 1 to 10; and
(b) optionally, at least one compound selected from the group consisting of
(b)(i) at least one dibasic ester;
(b)(ii) at least one compound of formula (IIa):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
(b)(iii) at least one alkyldimethylamide;
(b)(iv) at least one alkyl lactate;
(b)(v) ethyl levulinate;
(b)(vi) at least one alkyoxyalcohol, ether alcohol, amine alcohol, amino alcohol or alcohol;
(b)(vii) at least one glycerine or glycerine derivative;
(b)(viii) at least one alkylene carbonate; and
(b)(ix) dimethylsulfoxide.

4. The method of claim 3 wherein the solvent comprises:
(a) at least one dioxolane compound of formula (Ia):

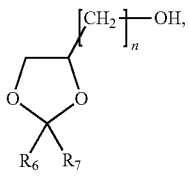

wherein $R_6$ and $R_7$ individually comprises a hydrogen, an alkyl group, an alkenyl group, or a phenyl group, wherein n is an integer of from 1 to 10; and
b) dimethylsulfoxide.

5. The method of claim 3 wherein the solvent comprises
(a) at least one dioxolane compound of formula (Ia):

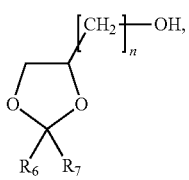

wherein $R_6$ and $R_7$ individually comprises a hydrogen, an alkyl group, an alkenyl group, or a phenyl group, wherein n is an integer of from 1 to 10; and
(b) at least at least one glycerine or glycerine derivative.

6. A concentrated liquid fertilizer composition comprising, based on 100 parts by weight of the composition:
(a) up to about 99 parts by weight of one or more nitrogenous fertilizer compounds,
(b) a dicyandiamide
(c) an organic solvent comprising:
(c)(i) at least one dioxolane compound of formula (Ia):

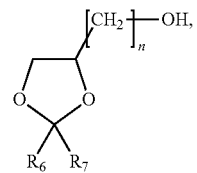

wherein $R_6$ and $R_7$ individually comprises a hydrogen, an alkyl group, an alkenyl group, or a phenyl group, wherein n is an integer of from 1 to 10; and
(c)(ii) optionally, at least one compound selected from the group consisting of
(c)(ii)(1) at least one dibasic ester;
(c)(ii)(2) at least one compound of formula (IIa):

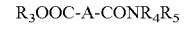

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
(c)(ii)(3) at least one alkyldimethylamide;
(c)(ii)(4) at least one alkyl lactate;
(c)(ii)(5) ethyl levulinate;
(c)(ii)(6) at least one alkyoxyalcohol, ether alcohol, amine alcohol, amino alcohol or alcohol;
(c)(ii)(7) at least one glycerine or glycerine derivative;
(c)(ii)(8) at least one alkylene carbonate; and
(c)(ii)(9) dimethylsulfoxide, and
(d) water.

7. A method of making an aqueous end use fertilizer composition comprising incorporating:
(a) one or more nitrogenous fertilizer compounds, and
(b) an inhibitor composition that comprises a dicyandiamide, the inhibitor composition dissolved in a liquid medium comprising:
(c)(i) at least one dioxolane compound of formula (Ia):

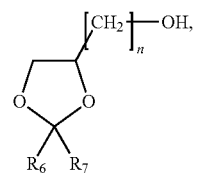

wherein $R_6$ and $R_7$ individually comprises a hydrogen, an alkyl group, an alkenyl group, or a phenyl group, wherein n is an integer of from 1 to 10; and
(c)(ii) optionally, at least one compound selected from the group consisting of
(c)(ii)(1) at least one dibasic ester;
(c)(ii)(2) at least one compound of formula (IIa):

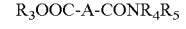

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;

(c)(ii)(3) at least one alkyldimethylamide;
(c)(ii)(4) at least one alkyl lactate;
(c)(ii)(5) ethyl levulinate;
(c)(ii)(6) at least one alkyoxyalcohol, ether alcohol, amine alcohol, amino alcohol or alcohol;
(c)(ii)(7) at least one glycerine or glycerine derivative;
(c)(ii)(8) at least one alkylene carbonate; and
(c)(ii)(9) dimethylsulfoxide, in an aqueous medium.

8. The method of claim 7 wherein the organic solvent comprises:
(a) at least one dioxolane compound of formula (Ia):

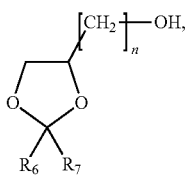

(Ia)

wherein $R_6$ and $R_7$ individually comprises a hydrogen, an alkyl group, an alkenyl group, or a phenyl group, wherein n is an integer of from 1 to 10; and
b) dimethylsulfoxide.

9. An aqueous end use fertilizer composition comprising, based on 100 parts by weight of the composition:
(a) up to about 99 parts by weight of one or more nitrogenous fertilizer compounds,
(b) a dicyandiamide,
(c) an organic solvent comprising:
(c)(i) at least one dioxolane compound of formula (Ia):

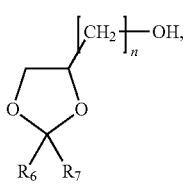

(Ia)

wherein $R_6$ and $R_7$ individually comprises a hydrogen, an alkyl group, an alkenyl group, or a phenyl group, wherein n is an integer of from 1 to 10; and
(c)(ii) optionally, at least one compound selected from the group consisting of
(c)(ii)(1) at least one dibasic ester;
(c)(ii)(2) at least one compound of formula (IIa):

$$R_3OOC\text{-}A\text{-}CONR_4R_5 \quad \text{(IIa)},$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;

(c)(ii)(3) at least one alkyldimethylamide;
(c)(ii)(4) at least one alkyl lactate;
(c)(ii)(5) ethyl levulinate;
(c)(ii)(6) at least one alkyoxyalcohol, ether alcohol, amine alcohol, amino alcohol or alcohol;
(c)(ii)(7) at least one glycerine or glycerine derivative;
(c)(ii)(8) at least one alkylene carbonate; and
(c)(ii)(9) dimethylsulfoxide; and
(d) water.

10. A method for fertilizing target plants, comprising applying an aqueous end use fertilizer composition that comprises:
(a) one or more nitrogenous fertilizer compounds
(b) a dicyandiamide
(c) an organic solvent comprising dimethyl sulfoxide and a heterocyclic alcohol according to structure (III):

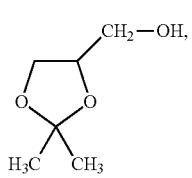

(III)

and
(d) water,
to the target plants or to an environment for the target plants.

* * * * *